United States Patent
Mestery et al.

(10) Patent No.: US 12,192,186 B2
(45) Date of Patent: *Jan. 7, 2025

(54) AUTOMATIC ENCRYPTION FOR CLOUD-NATIVE WORKLOADS

(71) Applicant: Cisco Technology, Inc., San Jose, CA (US)

(72) Inventors: Kyle Andrew Donald Mestery, Woodbury, MN (US); Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,417

(22) Filed: Nov. 14, 2023

(65) Prior Publication Data

US 2024/0080308 A1    Mar. 7, 2024

Related U.S. Application Data

(63) Continuation of application No. 17/513,062, filed on Oct. 28, 2021, now Pat. No. 11,824,845.

(51) Int. Cl.
*H04L 9/40* (2022.01)
*H04L 12/46* (2006.01)

(52) U.S. Cl.
CPC ...... *H04L 63/0485* (2013.01); *H04L 12/4633* (2013.01); *H04L 63/0236* (2013.01); *H04L 63/166* (2013.01)

(58) Field of Classification Search
CPC ............. H04L 63/0485; H04L 63/0236; H04L 63/166; H04L 12/4633

USPC ........................................................ 713/151
See application file for complete search history.

(56) References Cited

U.S. PATENT DOCUMENTS

| | | | |
|---|---|---|---|
| 9,755,953 B1 | 9/2017 | Morrissey et al. | |
| 2011/0231923 A1* | 9/2011 | Bollay | H04L 63/0442 726/9 |
| 2014/0376530 A1* | 12/2014 | Erickson | H04W 40/02 370/338 |
| 2016/0212098 A1 | 7/2016 | Roch | |

(Continued)

OTHER PUBLICATIONS

The PCT Search Report and Written Opinion mailed Feb. 2, 2023 for PCT application No. PCT/US2022/047867, 11 pages.

(Continued)

*Primary Examiner* — Michael S McNally
(74) *Attorney, Agent, or Firm* — Lee & Hayes, P.C.

(57) ABSTRACT

Techniques for routing service mesh traffic based on whether the traffic is encrypted or unencrypted are described herein. The techniques may include receiving, from a first node of a cloud-based network, traffic that is to be sent to a second node of the cloud-based network and determining whether the traffic is encrypted or unencrypted. If it is determined that the traffic is encrypted, the traffic may be sent to the second node via a service mesh of the cloud-based platform. Alternatively, or additionally, if it is determined that the traffic is unencrypted, the traffic may be sent to the second node via an encrypted tunnel. In some examples, the techniques may be performed at least partially by a program running on the first node of the cloud-based network, such as an extended Berkeley Packet Filter (eBPF) program, and the like.

19 Claims, 7 Drawing Sheets

(56) References Cited

U.S. PATENT DOCUMENTS

| | | | |
|---|---|---|---|
| 2019/0173841 A1* | 6/2019 | Wang | G06F 9/5083 |
| 2020/0336465 A1 | 10/2020 | Mestery et al. | |
| 2021/0083857 A1 | 3/2021 | Bergeron | |
| 2021/0273927 A1 | 9/2021 | Dhanabalan et al. | |
| 2021/0314359 A1* | 10/2021 | Thyagaturu | H04L 63/029 |
| 2023/0028642 A1* | 1/2023 | Li | H04L 63/0823 |
| 2023/0137255 A1 | 5/2023 | Mestery | |

OTHER PUBLICATIONS

Office Action for U.S. Appl. No. 17/513,062, mailed on Apr. 10, 2023, Inventor #1 Kyle Andrew Donald Mestery, "Automatic Encryption for Cloud-Native Workloads," 9 pages.

* cited by examiner

AUTOMATIC ENCRYPTION FOR CLOUD-NATIVE WORKLOADS

CROSS-REFERENCE TO RELATED APPLICATION

This application is a continuation of and claims priority to U.S. patent application Ser. No. 17/513,062, filed on Oct. 28, 2021, the contents of which is fully incorporated herein by reference in its entirety and for all purposes.

TECHNICAL FIELD

The present disclosure relates generally to routing, between nodes and/or pods hosted on a cloud-based network, traffic that is moving through a service mesh based on whether the traffic is encrypted or unencrypted.

BACKGROUND

Cloud-native workloads may use one or more different communication types, including both encrypted network connections and unencrypted network connections. Service mesh architectures provide convenient ways for these workloads to communicate with each other, and are typically designed to handle encrypted traffic. Additionally, container network interface (CNI) plugins may be used to provide mesh-like networks between container nodes, thereby allowing for secure pod to pod communications using both layer 7 (L7) or layer 3 (L3) protocols.

However, service mesh and CNI plugins fail to dynamically deal with cloud-native workloads that, individually, use both encrypted and unencrypted traffic. In such a scenario, encrypted tunnels may need to be statically configured using a CNI plugin, which means that both encrypted and unencrypted traffic would traverse the same tunnel. Even worse, in many of these types of scenarios, the encrypted traffic is double encrypted.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
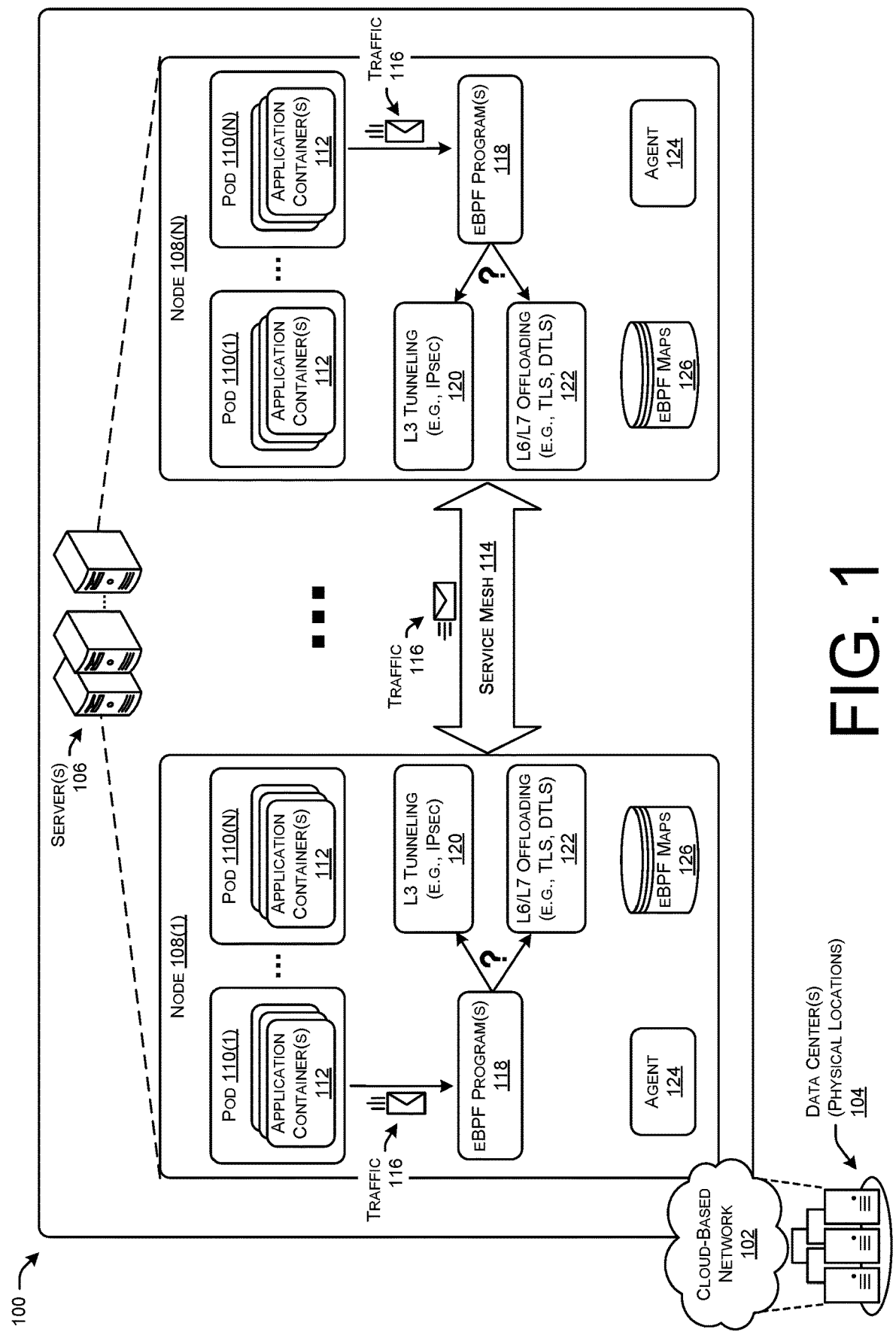
FIG. 1 illustrates a system-architecture diagram of an example environment that can implement aspects of the technologies disclosed herein. The environment includes a cloud-based network in which components, such as the server(s), nodes, pods, application container(s), etc., may communicate with one another using a service mesh.

This disclosure describes techniques for, among other things, routing traffic that is moving through a service mesh based on whether the traffic is encrypted or unencrypted. By way of example, and not limitation, a method according to the techniques disclosed herein may include receiving, from a first pod hosting a first container associated with a microservices application, traffic that is to be sent to a second pod. In some examples, the method may include determining that Layer-7 (L7) data within the traffic is unencrypted. Based at least in part on the L7 data being unencrypted, the method may include causing the traffic to be sent to the second pod via a Layer-3 (L3) encrypted tunnel between the first pod and the second pod.

Additionally, the techniques described herein may be performed by a system and/or device having non-transitory computer-readable media storing computer-executable instructions that, when executed by one or more processors, performs the method described above.

Example Embodiments

This application is directed to techniques associated with node-to-node and/or pod-to-pod communication for applications using a service mesh, a container network interface (CNI) plugin, or similar. In some scenarios, the traffic that is crossing nodes/pods using service meshes or CNI plugins can be encrypted traffic (e.g., TLS, DTLS, IPsec, and the like), or unencrypted traffic (e.g., non-TLS, -DTLS, -IPsec, and the like). Generally, it may be preferable for all traffic to be encrypted, but double encryption, however, is generally sub-optimal. The techniques disclosed herein allow for the automatic detection of encrypted traffic and unencrypted traffic such that the unencrypted flows may be directed through an encrypted tunnel, while the encrypted flows may be directed across a service mesh outside of the encrypted tunnel. In this way, double encryption of traffic can be avoided while also ensuring that all traffic flows between nodes have at least some level of encryption.

In some examples, an extended Berkeley Packet Filter (eBPF) program may be used to detect whether traffic (e.g., node traffic, pod traffic, container traffic, etc.) is encrypted or unencrypted. For instance, one or more nodes hosted on a scalable application service platform (e.g., a container orchestration platform such as Kubernetes) may include eBPF program(s) for detecting whether traffic is encrypted or unencrypted. In at least one example, if the eBPF program detects encrypted traffic, it may redirect that flow to avoid double encryption (e.g., by sending the encrypted traffic directly to the other pod or node across the service mesh).

For instance, if the eBPF program detects TLS or DTLS traffic, it may redirect the flow into a kernel TLS and/or DTLS engine for proper pod to pod communication using offload processing. If, however, the flow is not using TLS or DTLS, the eBPF program may dynamically adjust the flow to move it through, for instance, IPsec code in the kernel, utilizing XFRM/ESP code to tunnel it between pods/nodes.

In some examples, an agent and eBPF maps may be used to program the eBPF programs running in the kernel on each node. The agent and eBPF maps may act as control nodes for the node-to-node communication by, for instance, configuring parameters for IPsec tunnels, storing a detection algorithm for detecting encrypted or unencrypted traffic, and other control aspects. In at least one example, the agent is able to dynamically load certificates for TLS or DTLS into the kernel TLS/DTLS engine for the dynamic offload of those protocols for the appropriate traffic types.

As an example in which the encrypted traffic is DTLS traffic, the agent may configure node-to-node IPsec tunnels, and then load the eBPF program such that the program hooks onto sockets for applications on the nodes. As applications are launched, some of the applications may be setup with DTLS encryption. As such, the certificates for DTLS may be loaded into the kernel DTLS engine on each node. As the applications communicate, the eBPF program may detect DTLS traffic flows and sends those directly into the kernel DTLS offload engine. Additionally, or alternatively, as the applications communicated, the eBPF program may detect unencrypted traffic (e.g., non-DTLS traffic) and redirect those flows into the IPsec tunnel. In some examples, the eBPF program may utilize first-packet-inspection methodologies and/or other techniques to determine whether the traffic is encrypted or unencrypted.

By way of example, and not limitation, a method according to the technologies disclosed herein may include techniques for establishing an encrypted tunnel between a first node of a cloud-based network and a second node of the cloud-based network. In some examples, the encrypted tunnel may be any one of a layer 2 (L2) through layer 7 (L7) encrypted tunnel, such as an IPsec tunnel (L3), MACSEC tunnel (L2), (D)TLS tunnel (L3), Wireguard tunnel (L3), MASQUE tunnel (L7), and/or the like. In one example, the encrypted tunnel is established by an agent executing on the first node and/or the second node. In some instances, the cloud-based network may be a scalable application service platform, such as Kubernetes or another container orchestration system capable of running/hosting containerized applications and/or services.

In some examples, the techniques may include receiving, from the first node, traffic that is to be sent to the second node. In some examples, the traffic may be L7, L6, or L3 encrypted traffic, such as TLS traffic, DTLS traffic, IPsec traffic, and/or the like. Additionally, or alternatively, the traffic may be unencrypted traffic. In one example, the traffic is received at an eBPF program or similar program that is running in a kernel space of the first node. In some instances, the traffic may be received from a first pod running on the first node, the first pod hosting one or more containers associated with a microservices application.

In some instances, the techniques may include determining whether the traffic is encrypted or unencrypted. For instance, the eBPF or similar program may determine whether the traffic is encrypted or unencrypted. In various examples, the eBPF program may utilize first-packet-inspection methodologies and/or other techniques to determine whether the traffic is encrypted or unencrypted. In various examples, determining whether the traffic is encrypted or unencrypted may include determining whether the traffic is transport layer security (TLS) traffic or non-TLS traffic, datagram transport layer security (DTLS) traffic or non-DTLS traffic internet protocol security (IPsec) traffic or non-IPsec traffic, and/or the like.

In some examples, if it is determined that the traffic is encrypted, the traffic may be sent to the second node via a service mesh of the cloud-based platform. For instance, the traffic may be sent directly to the second node via the service mesh if the traffic is already encrypted (e.g., TLS traffic, DTLS traffic, IPsec traffic, etc.). In some examples, sending the traffic to the second node may additionally, or alternatively, comprise redirect the traffic into a kernel L6/L7 engine for proper pod to pod communication using offload processing.

In some examples, if it is determined that the traffic is unencrypted, the traffic may be sent to the second node via the encrypted tunnel between the first node and the second node. For instance, the traffic may be sent to the second node via an L3 encrypted tunnel (or another encrypted tunnel) based at least in part on determining that the traffic is not L7, 16, or L3 encrypted (e.g., non-TLS traffic, non-DTLS traffic, non-IPsec traffic, etc.). In some examples, sending the traffic to the second node via the encrypted tunnel may additionally, or alternatively, comprise adjusting the traffic flow to move it through IPsec code in the kernel, utilizing XFRM/ESP code to tunnel it between pods/nodes.

According to the techniques described herein, several advantages in computer-related technology can be realized. For instance, double encryption of encrypted traffic can be avoided. Additionally, traffic can be routed more securely between nodes/pods of a cloud-based network by adding encryption to unencrypted flows. Further, the techniques described herein allow microservices to use different types of traffic for communication, which may be either encrypted or unencrypted. Other advantages will be readily apparent to those having skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that can implement aspects of the technologies disclosed herein. The environment 100 includes a cloud-based network 102 in which components, such as the server(s) 106, nodes 108, pods 110, application container(s) 112, etc., may communicate with one another using a service mesh 114.

The cloud-based network 102 may comprise one or more data center(s) 104 that include various networking devices, such as, for example, the servers 106(1)-106(N) (where N represents any number greater than or equal to one). The data center(s) 104 may be located across geographic areas, and the cloud-based network 102 may be a distributed network through which users (often customers) may interact via user devices to manage or otherwise interact with a service provided by the cloud-based network 102. The cloud-based network 102 may be representative of a scalable application service platform, such as Kubernetes, for example, or another container orchestration system capable of hosting containerized applications and/or services.

The cloud-based network 102 may provide on-demand availability of computing system resources of the server(s) 106, such as data storage, computing power (e.g., CPU, GPU, etc.), networking, databases, etc., without direct active management by users. In some examples, the cloud-based network 102 may be managed and maintained by a service provider such that consumers do not have to invest in and maintain the computing infrastructure for their computing resource needs. Generally, a consumer may be provided access to, or allocated use of, a portion of the computing resources of the server(s) 106 in the cloud-based network 102. The cloud-based network 102 may scale, such as by spinning up resources or spinning down resources, based on demand for the individual users. Portions of the cloud-based network 102 may be allocated using hardware virtualization such that portions of the cloud-based network 102 can be configured and managed by the consumer (e.g., security configuration, load balancing configuration, etc.). However, the cloud-based network 102 need not be managed by a service provider, and can be managed by any entity, including end users themselves that run the applications or services.

In some examples, the server(s) 106 may be physical servers and/or virtual servers. The server(s) 106 may host one or more nodes 108(1)-108(N) (where N represents any number of the nodes 108). A node 108 may be a virtual or physical machine that is managed by a control plane of the cloud-based network 102. The node(s) 108 may contain one or more services necessary to run one or more pods 110(1)-110(N) (where N represents any number greater than or equal to one). The cloud-based network 102 may run applications, services, and/or workloads by placing one or more application container(s) 112 into the pods 110(1)-110(N) to run on a node 108. However, different topologies and/or architectures of the environment 100 and/or the cloud-based network 102 are contemplated. Each of the application container(s) 112 may be configured to execute one of various operations and act as one or more virtual components for the cloud-based network 102. In some examples, the application container(s) 112 may host at least one process associated with a workload, application, or service.

Generally, the number of application container(s) 112 may scale based on a number of end users interacting with the cloud-based network 102. The end users may comprise one or more of individual users, groups of users, organizations, businesses, or other entities that interact with the cloud-based network 102 via respective user devices. The user devices may be any type of computing device capable of connecting to the cloud-based network 102 via a suitable data communications network such as, but not limited to, a laptop or desktop computer, a tablet computing device, a server computer, a television, or a mobile telephone. Administrative users employed by the cloud-based network 102, such as administrators managing the operation of the cloud-based network 102, might also connect with, manage, and utilize resources provided by the cloud-based network 102 in a similar fashion.

In some examples, the nodes 108 and/or the pods 110 may send traffic 116 to other nodes 108 and/or pods 110 of the cloud-based network 102. For instance, the nodes 108 and the pods 110 may send the traffic 116 using the service mesh 114 or a CNI plugin. In some examples, the traffic 116 may be encrypted or unencrypted. The traffic 116 may be received by one or more eBPF program(s) 118 running on the nodes 108, and the eBPF program(s) 118 may determine whether the traffic is encrypted or unencrypted. In various examples, the eBPF program(s) 118 may utilize first-packet-inspection methodologies and/or other techniques to determine whether the traffic 116 is encrypted or unencrypted.

If the traffic 116 is unencrypted, the eBPF program(s) 118 may cause the traffic 116 to be redirected to an L3 tunneling component 120 such that the traffic 116 may be sent through an encrypted tunnel to its destination. In some examples, the L3 tunneling component 120 may represent IPsec code stored in a kernel space of the node 108. Additionally, or alternatively, if the traffic 116 is encrypted, the eBPF program(s) 118 may cause the traffic 116 to be redirected to an L6/L7 offloading component 122 such that the traffic 116 may be sent directly to its destination via the service mesh 114. In at least one examples, the L6/L7 offloading component 122 represents a kernel TLS or DTLS engine for pod to pod communication using offload processing.

The nodes 108 may also include an agent 124 and eBPF maps 126. In some examples, the agent 124 and the eBPF maps 126 may be used to program the eBPF program(s) 118 running in the kernel space on each node. The agent 124 and the eBPF maps 126 may logically act as control nodes for the node-to-node communication by, for instance, configuring parameters for IPsec tunnels, storing a detection algorithm for detecting encrypted or unencrypted traffic 116, and other control aspects. In at least one example, the agent 124 is able to dynamically load certificates for TLS or DTLS into a kernel TLS/DTLS engine (e.g., the L6/L7 offloading component 122) for the dynamic offload of those protocols for the appropriate traffic types.

As an example in which the traffic 116 is encrypted DTLS traffic, the agent 124 may configure node-to-node IPsec tunnels, and then load the eBPF program(s) 118 such that the program(s) 118 hook onto sockets for application containers 112 or pods 110 on the nodes 108. As applications are launched, some of the applications may be setup with DTLS encryption. As such, the certificates for DTLS may be loaded into the kernel DTLS engine (e.g., the L6/L7 offloading component 122) on each node 108. As the applications communicate, the eBPF program(s) 118 may detect DTLS traffic flows and sends those directly into the kernel DTLS offload engine (e.g., the L6/L7 offloading component 122). Additionally, or alternatively, as the applications communicate, the eBPF program(s) 118 may detect unencrypted traffic (e.g., non-DTLS traffic) and redirect those flows into the IPsec tunnel (e.g., the L3 tunneling component 120).

Figure 2:
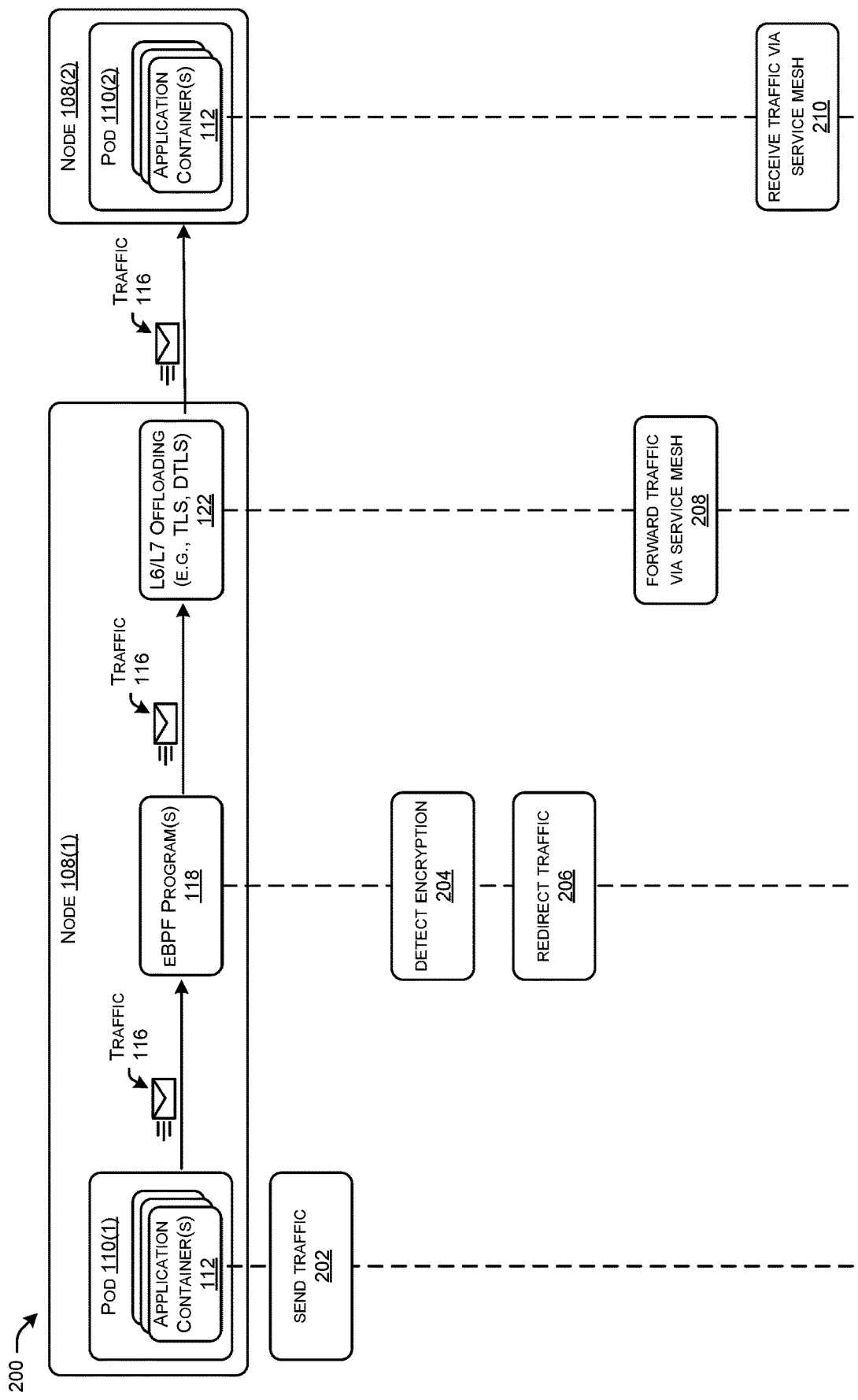
FIG. 2 is a system-level flow diagram illustrating an example process and operations that may be performed by components of a cloud-based network to implement aspects of the technologies disclosed herein for routing encrypted traffic moving through a service mesh.

FIG. 2 is a system-level flow diagram illustrating an example process 200 and operations 202-210 that may be performed by components of a cloud-based network to implement aspects of the technologies disclosed herein for routing encrypted traffic moving through a service mesh. At operation 202 of the process 200, the pod 110(1) and/or the application container(s) 112 may send traffic 116. For instance, the pod 110(1) and/or the application container(s) 112 may be sending traffic 116 to the pod 110(2) and or the application container(s) 112 that are being hosted on the node 108(2).

At operation 204, the eBPF program(s) 118 may receive the traffic 116 and detect that the traffic 116 is encrypted. For instance, the eBPF program(s) 118 may determine that the traffic 116 is encrypted based on utilizing first-packet-inspection methodologies and/or other techniques. In some examples, detecting the encryption by the eBPF program(s) 118 may comprise detecting that the traffic 116 is TLS traffic, DTL traffic, IPsec traffic, or the like.

At operation 206, based at least in part on detecting the encryption of the traffic 116, the eBPF program(s) 118 may redirect the traffic 116. For instance, the eBPF program(s) 118 may redirect the traffic 116 to the L6/L7 offloading component 122 of the node 108(1) to cause the traffic 116 to be sent directly to the node 108(2) outside of an encrypted tunnel (e.g., directly over a service mesh).

At operation 208, the L6/L7 offloading component 122 may forward the traffic 116 to the node 108(2) via the service mesh. This may ensure that the already encrypted traffic 116 is not double encapsulated. At operation 210, the destination component (e.g., the application container(s) 112, the pod 110(2), or the node 108(2) may receive the traffic 116 via the service mesh.

Figure 3:
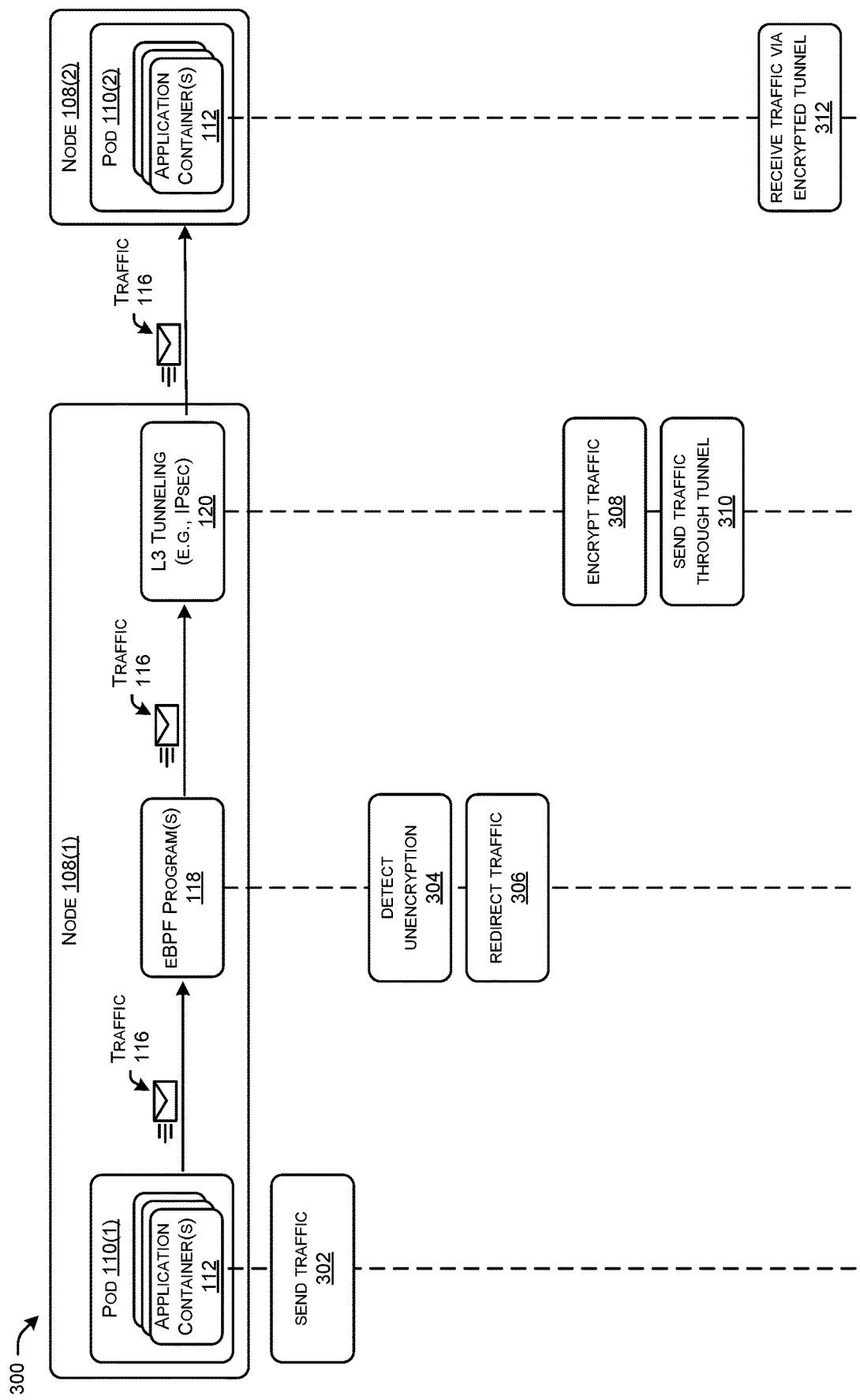
FIG. 3 is a system-level flow diagram illustrating another example process and operations that may be performed by components of a cloud-based network to implement aspects of the technologies disclosed herein for routing unencrypted traffic moving through a service mesh.

FIG. 3 is a system-level flow diagram illustrating another example process 300 and operations 302-312 that may be performed by components of a cloud-based network to implement aspects of the technologies disclosed herein for routing unencrypted traffic moving through a service mesh. At operation 302 of the process 300, the pod 110(1) and/or the application container(s) 112 may send traffic 116. For instance, the pod 110(1) and/or the application container(s) 112 may be sending traffic 116 to the pod 110(2) and or the application container(s) 112 that are being hosted on the node 108(2).

At operation 304, the eBPF program(s) 118 may receive the traffic 116 and detect that the traffic 116 is unencrypted. For instance, the eBPF program(s) 118 may determine that the traffic 116 is unencrypted based on utilizing first-packet-inspection methodologies and/or other techniques. In some examples, detecting the un-encryption by the eBPF program(s) 118 may comprise detecting that the traffic 116 is non-TLS traffic, non-DTL traffic, non-IPsec traffic, or the like.

At operation 306, based at least in part on detecting the un-encryption of the traffic 116, the eBPF program(s) 118 may redirect the traffic 116. For instance, the eBPF program(s) 118 may redirect the traffic 116 to the L3 tunneling component 120 of the node 108(1) to cause the traffic 116 to be sent to the node 108(2) via an encrypted tunnel (e.g., an L3 encrypted tunnel, such as an IPsec tunnel).

At operation 308, the L3 tunneling component 120 may encrypt the traffic 116 (e.g., by encapsulating individual packets of the traffic 116) and, at operation 310, forward the traffic 116 to the node 108(2) via the encrypted tunnel. This may ensure that the unencrypted traffic 116 has some level of protection and encryption for being sent between nodes. At operation 312, the destination component (e.g., the application container(s) 112, the pod 110(2), or the node 108(2) may receive the traffic 116 via the encrypted tunnel.

Figure 4:
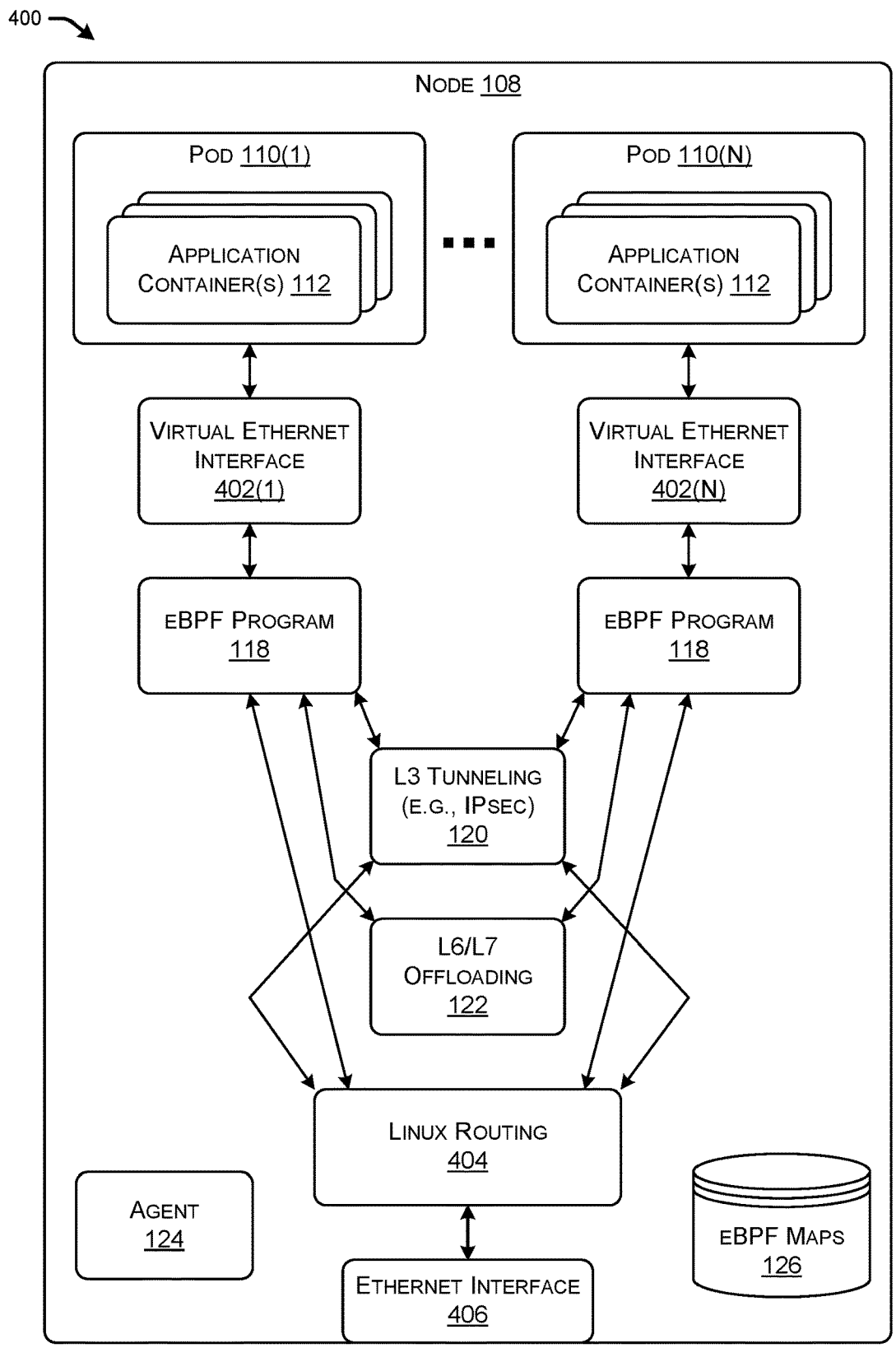
FIG. 4 is a block diagram showing example detail and functionality of a node that may implement aspects of the technologies disclosed herein for routing encrypted and unencrypted traffic moving through a service mesh.

FIG. 4 is a block diagram showing example detail 400 and functionality of a node 108 that may implement aspects of the technologies disclosed herein for routing encrypted and unencrypted traffic moving through a service mesh. The node 108 may be a virtual or physical machine that is managed by a control plane of a cloud-based network and run on a physical and/or virtual server of the cloud-based network, such as the server(s) 106 of the cloud-based network 102. The node 108 may contain one or more services necessary to run the one or more pods 110(1)-110(N). A cloud-based network (e.g., Kubernetes or another container orchestration system) may run applications, services, and/or workloads by placing one or more application container(s) 112 into the pods 110(1)-110(N) to run on the node 108. Each of the application container(s) 112 may be configured to execute one of various operations and act as one or more virtual components. In some examples, the application container(s) 112 may host at least one process associated with a workload, application, or service.

The node 108 may include one or more virtual ethernet interfaces 402(1)-402(N) that allow the eBPF programs 118 to receive traffic from the pods 110(1) and 110(N), respectively. The eBPF programs 118 may communicate with L3 tunneling component 120, the L6/L7 offloading component 122, and a Linux routing component 404. The node 108 may also include an ethernet interface 406, which may be physical or virtual, and usable to send traffic between nodes of a cloud-based network.

The node 108 may also include the agent 124 and the eBPF maps 126. In some examples, the agent 124 and the eBPF maps 126 may be used to program the eBPF programs 118 running in the kernel space of the node 108. The agent 124 and the eBPF maps 126 may logically act as control nodes for the node-to-node communication by, for instance, configuring parameters for IPsec tunnels, storing a detection algorithm for detecting encrypted or unencrypted traffic 116, and other control aspects. In at least one example, the agent 124 is able to dynamically load certificates for TLS or DTLS into a kernel TLS/DTLS engine (e.g., the L6/L7 offloading component 122) for the dynamic offload of those protocols for the appropriate traffic types.

In some examples, the L3 tunneling component 120 may represent IPsec code or other L3 encapsulation code stored in a kernel space of the node 108. Additionally, the L6/L7 offloading component 122 may represent a kernel TLS or DTLS engine for pod to pod communication of TLS or DTLS encrypted traffic using offload processing.

Figure 5:
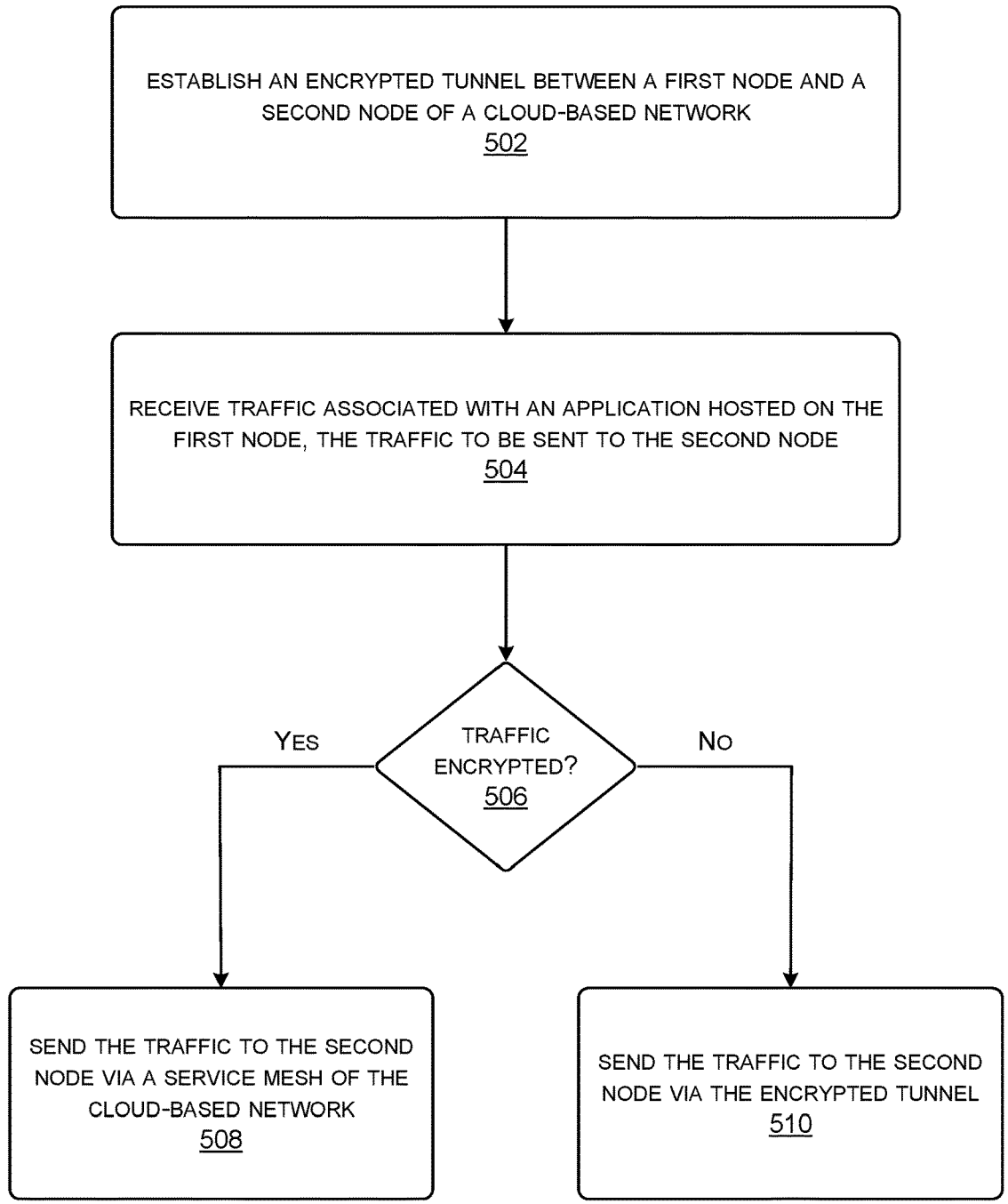
FIG. 5 is a flow diagram illustrating an example method associated with routing traffic that is moving through a service mesh based on whether the traffic is encrypted or unencrypted.

FIG. 5 is a flow diagram illustrating an example method 500 associated with routing traffic that is moving through a service mesh based on whether the traffic is encrypted or unencrypted. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 500 begins at operation 502, which includes establishing an encrypted tunnel between a first node and a second node of a cloud-based network. For instance, the agent(s) 124 running on the nodes 108(1) or 108(N) may establish the encrypted tunnel between the first node 108(1) and the second node 108(N). In some examples, the encrypted tunnel may comprise an L3 encrypted tunnel, such as an IPsec tunnel or another L3 encrypted protocol tunnel.

At operation 504, the method 500 includes receiving traffic associated with an application hosted on the first node, the traffic to be sent to the second node. For instance, the eBPF program(s) 118 may receive the traffic 116 associated with an application container 112 running on a pod 110 that is hosted on the node 108(1).

At operation 506, the method 500 includes determining whether the traffic is encrypted or unencrypted. For instance, the eBPF program(s) 118 may determine whether the traffic 116 is encrypted or unencrypted. In some examples, the eBPF program(s) 118 may utilize first-packet-inspection methodologies and/or other techniques for determining whether the traffic 116 is encrypted or unencrypted. In at least one example, the eBPF program(s) 118 determine whether the traffic 116 is TLS traffic or non-TLS traffic, DTLS traffic or non-DTLS traffic, IPsec traffic or non-IPsec traffic, and/or the like.

If it is determined at operation 506 that the traffic is encrypted, then the process 500 proceeds to operation 508. Alternatively, if it is determined at operation 506 that the traffic is unencrypted, then the process 500 proceeds to operation 510.

At operation 508, the method 500 includes sending the traffic to the second node via a service mesh of the cloud-based network. For instance, the eBPF program(s) 118 may cause the traffic 116 to be sent to the node 108(N) via the service mesh 114 of the cloud-based network 102. That is, the eBPF program(s) 118 may cause the traffic 116 to be sent to the node 108(N) outside of the encrypted tunnel. For instance, because the traffic 116 was determined to be encrypted, sending the traffic 116 through the encrypted tunnel would cause the traffic 116 to be double encrypted. In some examples, sending the encrypted traffic to the second node may comprise directing the traffic through the L6/L7 offloading component 122, which may represent a kernel TLS or DTLS engine.

At operation 510, the method 500 includes sending the traffic to the second node via the encrypted tunnel. For instance, the eBPF program(s) 118 may cause the traffic 116 to be sent to the node 108(N) via the encrypted tunnel established at operation 502. That is, the eBPF program(s) 118 may cause the traffic 116 to be sent to the node 108(N) through the encrypted tunnel. For instance, because the traffic 116 was determined to be unencrypted, sending the traffic 116 through the encrypted tunnel would cause the traffic 116 to be encrypted for security advantages. In some examples, sending the unencrypted traffic to the second node may comprise directing the traffic through the L3 tunneling component 120, which may represent an IPsec tunnel. In some examples, the eBPF programs 118 or the L3 tunneling component 120 may encapsulate packets of the traffic to send it through the encrypted tunnel. In some instances, sending the traffic to the second node via the encrypted tunnel may comprise sending the traffic to the second node via an encrypted service mesh, and in other instances this may comprise sending the traffic to the second node via an encrypted tunnel outside of the service mesh.

Figure 6:
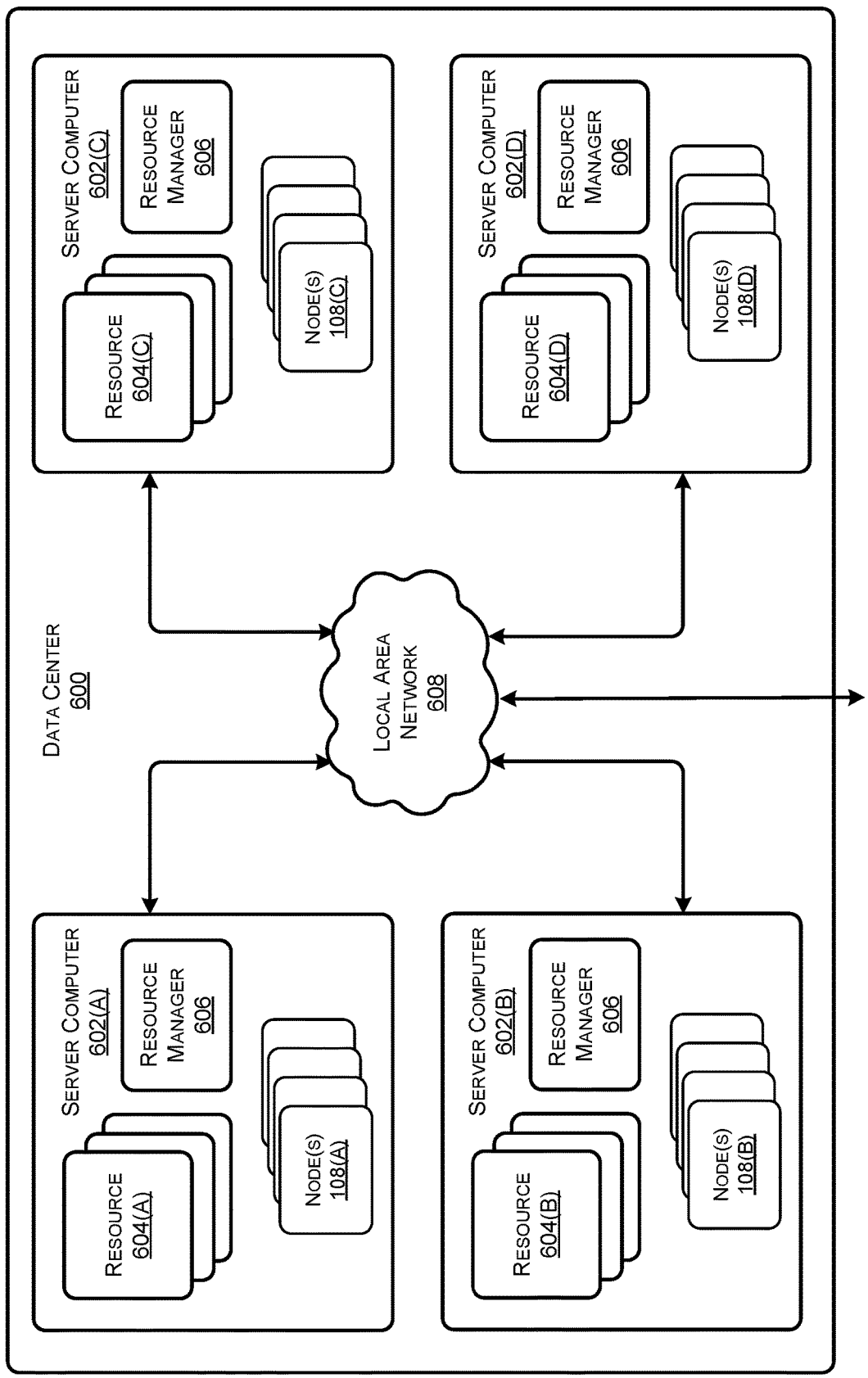
FIG. 6 is a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602D (which might be referred to herein singularly as "a server computer 602" or in the plural as "the server computers 602") for providing computing resources 604A-604D. In some examples, the server computers 602 may include, or correspond to, the server(s) 106 described herein.

The server computers 602 can be standard tower, rack-mount, or blade server computers configured appropriately for providing the computing resources 604A-604D described herein. As mentioned above, the computing resources 604A-604D provided by the cloud-based network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services. In one example, the server computers 602A-602D may host one or more nodes 108A-108D, as described herein.

In the example data center 600 shown in FIG. 6, an appropriate local area network (LAN) 608 is also utilized to interconnect the server computers 602A-602D. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602D in each data center 600, and, potentially, between computing resources 604A-604D in each of the server computers 602. It should be appreciated that the configuration of the data center 600 described with reference to FIG. 6 is merely illustrative and that other implementations can be utilized. In some examples, the server computers 602 may each execute one or more containers 114 that support a workload 112 (e.g., service or application) provisioned across a set or cluster of servers 602.

In some instances, the cloud-based network 102 may provide computing resources, like application containers, VM instances, and storage, on a permanent or an as-needed basis. Among other types of functionality, the computing resources provided by the cloud-based network 102 may be utilized to implement the various services described above. The computing resources provided by the cloud-based network 102 can include various types of computing resources, such as data processing resources like application containers and VM instances, data storage resources, networking resources, data communication resources, network services, and the like.

Each type of computing resource provided by the cloud-based network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud-based network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
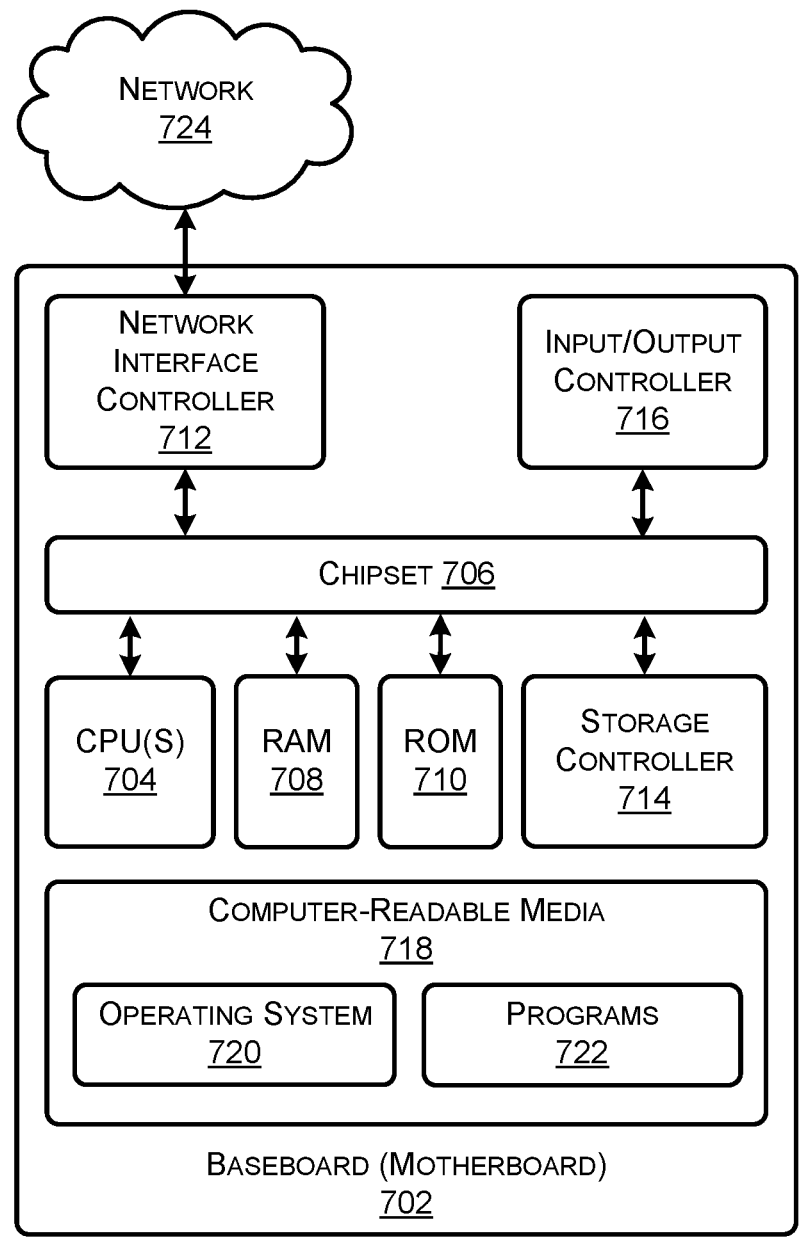
FIG. 7 is a computer architecture diagram showing an illustrative computer hardware architecture that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to the physical servers 106 described herein.

The server computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server computer 602. The chipset 706 can further provide an interface to a computer-readable storage medium such as a read-only memory ("ROM") 710 or non-volatile RAM ("NVRAM") for storing basic routines that help to startup the server computer 602 and to transfer information between the various components and devices. The ROM 710 or NVRAM can also store other software components necessary for the operation of the server computer 602 in accordance with the configurations described herein.

The server computer 602 can operate in a networked environment using logical connections to remote computing devices and computer systems through a network, such as the network 724. The chipset 706 can include functionality for providing network connectivity through a NIC 712, such as a gigabit Ethernet adapter. The NIC 712 is capable of connecting the server computer 602 to other computing devices over the network 724 (or 608). It should be appreciated that multiple NICs 712 can be present in the server computer 602, connecting the computer to other types of networks and remote computer systems.

The server computer 602 can be connected to a storage device 718 that provides non-volatile storage for the computer. The storage device 718 can store an operating system 720, programs 722, and data, which have been described in greater detail herein. The storage device 718 can be connected to the server computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the server computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 602 can further read information from the storage device 718 by detecting the physical states or characteristics of one or more particular locations within the physical storage units.

In addition to the mass storage device 718 described above, the server computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 602. In some examples, the operations performed by the cloud-based network 102, and or any components included therein, may be supported by one or more devices similar to server computer 602. Stated otherwise, some or all of the operations performed by the cloud-based network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that any other operating systems can also be utilized, such as IOS, MacOS, and the like. The storage device 718 can store other system or application programs and data utilized by the server computer 602.

In one embodiment, the storage device 718 or other computer-readable storage media is encoded with computer-executable instructions which, when loaded into the server computer 602, transform the computer from a general-purpose computing system into a special-purpose computer capable of implementing the embodiments described herein. These computer-executable instructions transform the server computer 602 by specifying how the CPUs 704 transition between states, as described above. According to one embodiment, the server computer 602 has access to computer-readable storage media storing computer-executable instructions which, when executed by the server computer 602, perform the various processes described above with regard to FIGS. 1-5. The server computer 602 can also include computer-readable storage media having instructions stored thereupon for performing any of the other computer-implemented operations described herein.

The server computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the server computer 602 might not include all of the components shown in FIG. 7, can include other components that are not explicitly shown in FIG. 7, or might utilize an architecture completely different than that shown in FIG. 7.

The server computer 602 may support a virtualization layer, such as one or more containers 114 executing on the server computer 602. In some examples, the virtualization layer may be supported by a hypervisor that provides one or more virtual machines running on the server computer 602 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a first pod hosting a first container associated with a microservices application, traffic that is to be sent to a second pod;
determining that Layer-7 (L7) data within the traffic is unencrypted; and
based at least in part on the L7 data being unencrypted, causing the traffic to be sent to the second pod via a Layer-3 (L3) encrypted tunnel between the first pod and the second pod.

2. The method of claim 1, wherein the first pod is running on a first node associated with an orchestration system for managing containerized microservices applications.

3. The method of claim 2, wherein the second pod is running on a second node associated with the orchestration system.

4. The method of claim 1, wherein the second pod is hosting a second container associated with at least one of the microservices application or another microservices application.

5. The method of claim 1, wherein the method is performed at least partially by an extended Berkeley Packet Filter (eBPF) program that is running on a same node as the first pod.

6. The method of claim 1, wherein the L3 encrypted tunnel between the first pod and the second pod is established by an agent executing on a same node as at least one of the first pod or the second pod.

7. The method of claim 1, wherein the L3 encrypted tunnel between the first pod and the second pod is an internet protocol security (IPsec) tunnel.

8. The method of claim 1, wherein the L3 encrypted tunnel between the first pod and the second pod is at least one of a transport layer security (TLS) tunnel, datagram transport layer security (DTLS) tunnel, or a Wireguard tunnel.

9. The method of claim 1, wherein determining that the L7 data within the traffic is unencrypted is based at least in part on inspecting a first packet of the traffic.

10. A system comprising:
one or more processors; and
one or more non-transitory computer-readable media storing instructions that, when executed, cause the one or more processors to perform operations comprising:
receiving, from a first container host of an orchestration system for managing containerized microservices applications, traffic that is to be sent to a second container host of the orchestration system, the first container host and the second container host each hosting a container associated with a microservices application;
determining that Layer-7 (L7) data within the traffic is unencrypted, wherein determining that the L7 data within the traffic is unencrypted is based at least in part on inspecting a first packet of the traffic; and
based at least in part on the L7 data being unencrypted, causing the traffic to be sent to the second container host via a Layer-3 (L3) encrypted tunnel between the first container host and the second container host.

11. The system of claim 10, wherein the first container host is a first pod that is running on a first node of the orchestration system and the second container host is running on at least one of the first node or a second node associated with the orchestration system.

12. The system of claim 10, wherein the L3 encrypted tunnel between the first container host and the second container host is established by an agent executing on a same node as at least one of the first container host or the second container host.

13. The system of claim 10, wherein the L3 encrypted tunnel between the first container host and the second container host is an internet protocol security (IPsec) tunnel.

14. The system of claim 10, wherein the L3 encrypted tunnel between the first container host and the second container host is at least one of a transport layer security (TLS) tunnel, datagram transport layer security (DTLS) tunnel, or a Wireguard tunnel.

15. One or more non-transitory computer-readable media storing instructions that, when executed, cause one or more processors to perform operations comprising:
  receiving, from a first container host of an orchestration system for managing containerized microservices applications, traffic that is to be sent to a second container host of the orchestration system, the first container host and the second container host each hosting a container associated with a microservices application;
  determining that Layer-7 (L7) data within the traffic is unencrypted; and
  based at least in part on the L7 data being unencrypted, causing the traffic to be sent to the second container host via a Layer-3 (L3) encrypted tunnel between the first container host and the second container host.

16. The one or more non-transitory computer-readable media of claim 15, wherein the first container host is a first pod that is running on a first node of the orchestration system and the second container host is running on at least one of the first node or a second node associated with the orchestration system.

17. The one or more non-transitory computer-readable media of claim 15, wherein the L3 encrypted tunnel between the first container host and the second container host is established by an agent executing on a same node as at least one of the first container host or the second container host.

18. The one or more non-transitory computer-readable media of claim 15, wherein the L3 encrypted tunnel between the first container host and the second container host is an internet protocol security (IPsec) tunnel.

19. The one or more non-transitory computer-readable media of claim 15, wherein the L3 encrypted tunnel between the first container host and the second container host is at least one of a transport layer security (TLS) tunnel, datagram transport layer security (DTLS) tunnel, or a Wireguard tunnel.

* * * * *